United States Patent
Tsvetkov

(10) Patent No.: US 8,099,631 B2
(45) Date of Patent: Jan. 17, 2012

(54) CALL-STACKS REPRESENTATION FOR EASIER ANALYSIS OF THREAD DUMP

(75) Inventor: Krum Georgiev Tsvetkov, Walldorf (DE)

(73) Assignee: SAP AG, Walldorf (DE)

( * ) Notice: Subject to any disclaimer, the term of this patent is extended or adjusted under 35 U.S.C. 154(b) by 272 days.

(21) Appl. No.: 12/504,669

(22) Filed: Jul. 17, 2009

(65) Prior Publication Data

US 2011/0016357 A1 Jan. 20, 2011

(51) Int. Cl.
G06F 11/00 (2006.01)

(52) U.S. Cl. .................................................. 714/38.11

(58) Field of Classification Search .............. 714/27–35, 714/38.1, 38.11, 38.12, 38.13, 39, 45, 46, 714/47.1, 57
See application file for complete search history.

(56) References Cited

U.S. PATENT DOCUMENTS

| 6,282,701 | B1 * | 8/2001 | Wygodny et al. | 717/125 |
|---|---|---|---|---|
| 7,278,057 | B2 * | 10/2007 | Betancourt et al. | 714/38.11 |
| 7,478,368 | B2 * | 1/2009 | Hoover, Jr. et al. | 717/125 |
| 7,685,575 | B1 * | 3/2010 | Fareed | 717/131 |
| 7,698,686 | B2 * | 4/2010 | Carroll et al. | 717/125 |
| 2005/0028157 | A1 * | 2/2005 | Betancourt et al. | 718/100 |
| 2006/0248401 | A1 * | 11/2006 | Carroll et al. | 714/38 |
| 2007/0220513 | A1 * | 9/2007 | Hwang | 718/1 |
| 2009/0328005 | A1 * | 12/2009 | Miskelly | 717/125 |
| 2010/0223600 | A1 * | 9/2010 | Shafi et al. | 717/131 |

* cited by examiner

Primary Examiner — Nadeem Iqbal

(57) ABSTRACT

Computer systems and methods for call-stacks representation for easier analysis of thread dumps. Execution data for a number of process threads are accessed by a parser in a thread dump wherein execution data includes a number of call-stacks. Process threads have corresponding call-stacks comprising information about active program subroutines of the thread. Threads are grouped in a number of sets that include threads with one or more actions in common. The sets correspond to a same action or subroutine in the call-stacks of the grouped threads. A tree representation of the execution data is generated based on the active actions in the call-stacks. In the tree representation, a first set of grouped threads is a child to a second set of grouped threads when the action corresponding to the first set is invoked by the subroutine corresponding to the second set.

18 Claims, 9 Drawing Sheets

| Original Call-Stack Trace | Component Activity View |
|---|---|
| at java.lang.Object.wait()<br>at java.lang.Object.wait() | Waiting On Monitor |
| at com.sap.engine.lib.util.WaitQueue.dequeue() | com.sap.engine.lib.util |
| at com.sap.engine.core.cluster.impl6.ms.MSListenerQueue.run() | ConfigManager |
| at com.sap.engine.frame.core.thread.Task.run() | com.sap.engine.frame.core |
| at com.sap.engine.core.thread.impl5.SingleThread.execute()<br>at com.sap.engine.core.thread.impl5.SingleThread.run() | com.sap.engine.core.thread |
| at com.sap.engine.core.configuration.impl.event.QueuedEventProcessor.run() | com.sap.engine.core.cluster |

CALL-STACKS REPRESENTATION FOR EASIER ANALYSIS OF THREAD DUMP

FIELD OF INVENTION

The field of the invention relates generally to task or process execution control in computers. More specifically, the invention is related to process threads execution data analysis.

BACKGROUND OF THE INVENTION

Complex computer systems running complex applications often suffer from errors and sometimes become unresponsive to incoming requests. Typically, there are no log files that could be used for detecting and diagnosing what caused the problem and where it is located. In general, no log files are written to provide information about unresponsive computer systems. One of the ways to investigate what causes the problem is to analyze process snapshots, e.g., heap dumps, thread dumps. By definition, dumps contain the recorded state of a computer system at a specific time, usually when it encounters a problem.

A dump file or data structure holds execution data about programs running in the computer system at a particular moment. Execution data typically includes call-stacks for one or more process threads. Call-stacks are dynamic stack data structures that store or trace information about active subroutines of a computer program. One of the purposes of call-stacks is to keep track of the point where each active subroutine should return control when it finishes executing. Usually, there is one call-stack corresponding to one running thread of a running computer process. Call-stacks may include information about program objects executing or invoking subroutines or methods.

Generally, a thread dump provides execution data for each thread that is running at a particular moment, including the call-stacks of active subroutines for each thread. When a computer system does not respond to requests, the problem can often be due to deadlocks or lack of resources of an application server, e.g. database connections, etc. The nature of the problem could be inferred by the subroutines or actions currently executed by the threads of the running processes in the application server. In an enterprise environment, an application server could execute hundreds and even thousands of threads simultaneously with hundreds of thousands active subroutines. Analyzing such a large amount of execution data in order to identify the problem causing the lack of response to requests can be a cumbersome task.

SUMMARY OF THE INVENTION

Computer systems and methods for representation of call-stacks for easier analysis of thread dumps are described. In one aspect, execution data for a number of process threads are accessed by a parser in a thread dump wherein the execution data includes a number of call-stacks. In another aspect, process threads have corresponding call-stacks comprising information about active program subroutines of the thread. In one aspect, threads are grouped in a number of sets that include threads with one or more actions in common. The sets correspond to a same action or subroutine in the call-stacks of the grouped threads. A tree representation of the execution data is generated based on the active actions in the call-stacks. In the tree representation, a first set of grouped threads is a child to a second set of grouped threads when the action corresponding to the first set is invoked by the subroutine corresponding to the second set.

BRIEF DESCRIPTION OF THE DRAWINGS

A better understanding of the present invention can be obtained from the following detailed description in conjunction with the figures of the accompanying drawings in which like references indicate similar elements. It should be noted that references to "an" or "one" embodiment in this disclosure are not necessarily to the same embodiment, and such references mean at least one.

FIG. 6 illustrates a correspondence between exemplary call-stack fragments and condensed statements, according to one embodiment of the invention;

DETAILED DESCRIPTION

There are different hardware and software technologies available for building computer systems, and more specifically, for building application servers. In the description of the invention below, a number of examples based on Java™ technology and Java Enterprise Edition™ (Java EE) application server specification are provided. For one skilled in the art, it will be obvious that different embodiments of the invention may be based on other software or hardware technologies.

Most modern application servers, including Java EE™ application servers, support multithreading, where a large number of threads of one or more processes are running simultaneously. Program components developed by different vendors could run together as part of one software application. During the execution of the various program components, simultaneously running threads of different processes may cause the application server to become unresponsive to system or application requests, e.g., to hang. Execution of program components developed by different vendors could cause various problems including deadlocks, or runaway threads that consume resources and consume the available processor time.

Figure 1:
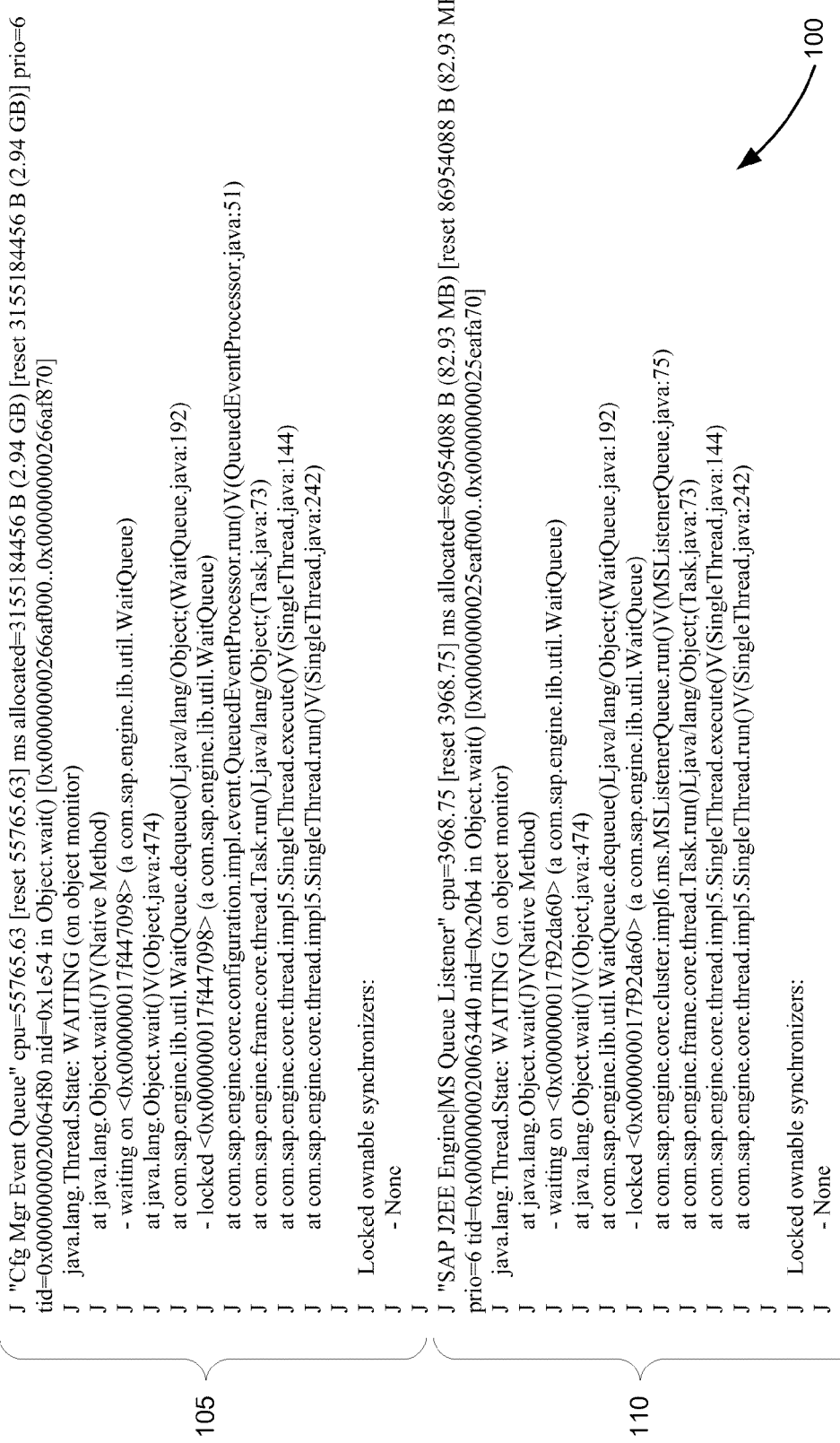
FIG. 1 is an excerpt of an exemplary thread dump illustrating call-stacks corresponding to process threads.

Thread dumps are tools for debugging or analyzing problems connected with the operability of computer systems. A thread dump is a snapshot of one or more running processes and process threads in an application server at a particular moment. Generally, thread dumps are created when an application server stops responding. A thread dump of an application server is usually stored as electronic flat file. FIG. 1 illustrates excerpt of a thread dump 100 of a Java EE™ application server. Illustrated thread dump excerpt 100 shows execution data for thread 105 and thread 110. The execution data includes call-stacks corresponding to threads 105 and 110, respectively. Call-stacks provide information for the active subroutines in the corresponding threads at the moment when the thread dump was created. This information is analyzed in order to identify the possible causes for unresponsiveness of an application server.

The task of investigating the cause of operability malfunction of an application server is especially important for enterprise environment that support critical processes, e.g., manufacture processes, healthcare, public security, online trade, etc. In an enterprise environment, an application server may execute a big number of process threads simultaneously. The thread dump of such an application server is very hard to read and analyze. Therefore, various applications and tools are developed to alleviate reading thread dumps. For example, thread analysis plug-ins for Eclipse Memory Analyzer that is co-developed by a number of vendors as part of Eclipse open source project is one such tool.

Figure 2:
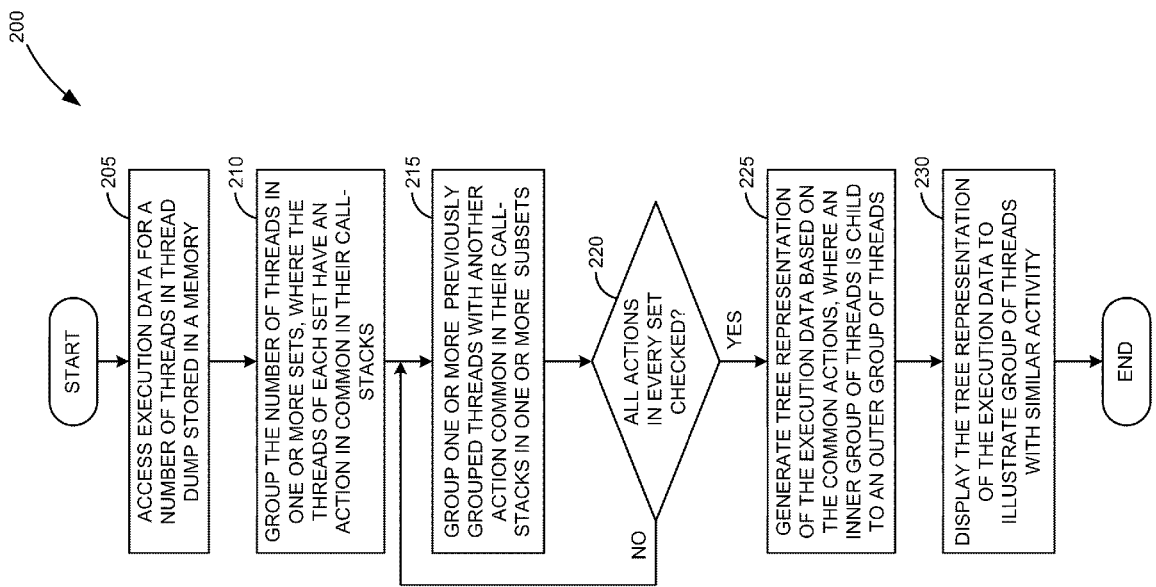
FIG. 2 illustrates a process for merging call-stacks of a number of threads and generation of call-stacks tree structure of a thread dump, according to one embodiment of the invention.

FIG. 2 depicts process 200 for merging a number of call-stacks of threads in a tree representation, according to one embodiment of the invention. The process could be applied to all threads in a thread dump, or to a selected number of threads. At block 205, execution data for a number of threads is accessed in a thread dump stored in a memory. In one embodiment of the invention, the thread dump is a file with flat structure, e.g., a text file, stored in a file system of a computer system. The file system could allocate one or more memory or storage hardware units, including Random Access Memory (RAM) units, one or more hard disc drive (HDD), one or more optical drives, etc. Alternatively, a thread dump could be stored in a database and the execution data could span one or more database tables. Other ways for storing thread dump execution data may be used as well.

At block 210, a number of threads from the thread dump are grouped in one or more sets of threads. The criterion for grouping threads in a set is that they have at least one subroutine or action in common for the corresponding call-stacks. Preferably, threads that share a particular action as their last started action or subroutine are grouped in a set at 210. Usually, the last started action of a thread is described by a line placed on top of a corresponding call-stack of a thread, when a thread dump is stored as a flat file. Consequently, all threads that execute the same subroutine at the moment of generation of the thread dump are grouped together at block 210. The terms "subroutine" and "action" refer to the same action. According to one embodiment of the invention, executing block 210 results in one or more sets of threads, where each set includes one or more threads with a same last started subroutine.

Figure 3:
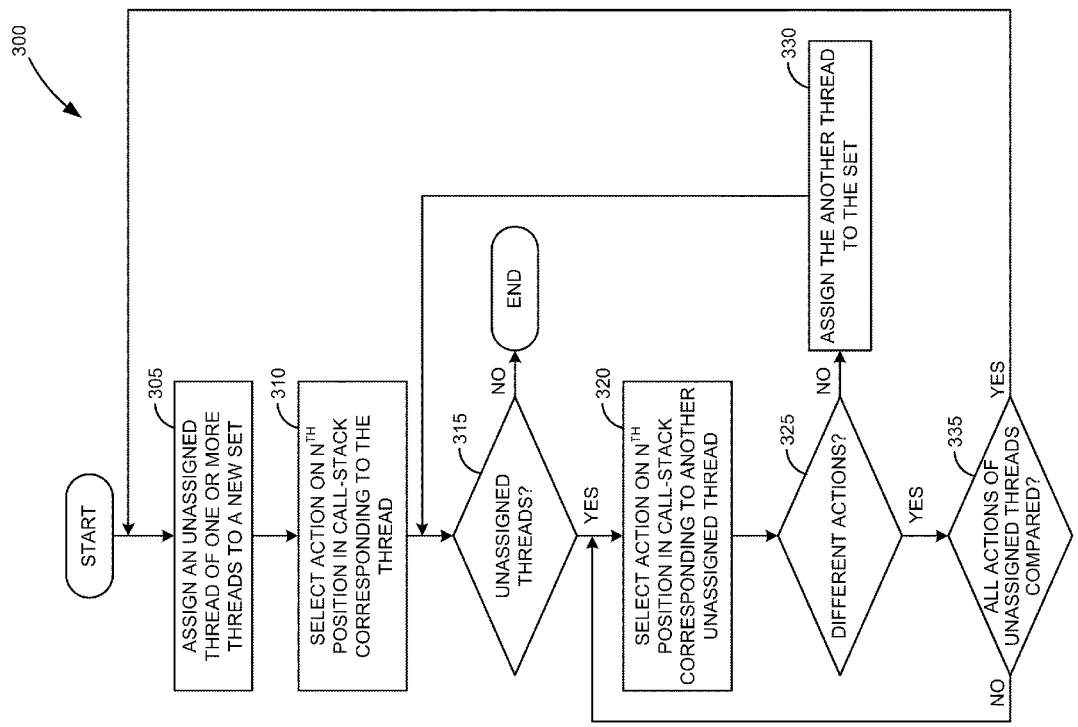
FIG. 3 illustrates a process for grouping a number of threads from a thread dump in one or more sets, according to one embodiment of the invention.

A methodology for grouping one or more threads in one or more sets is illustrated in FIG. 3 by process 300. According to one embodiment of the invention, process 300 could be applied at 210. Process 300 starts at 305 with assigning a thread from one or more threads to a new set. At 310, an action on $N^{th}$ position in the call-stack corresponding to the assigned thread is selected. The $N^{th}$ position may be the top position of the call-stack, corresponding to the last started subroutine in the thread, according to one embodiment of the invention. Alternatively, $N^{th}$ position could be another position in the call-stack, either from the top or from the bottom of the call-stack.

At 315, a check is performed to determine whether, among the one or more threads, there is at least one thread still not assigned to a set. If there are no threads left to assign, the process ends. Otherwise, at 320, an action on $N^{th}$ position in the call-stack corresponding to another, unassigned thread is selected. The two selected actions on $N^{th}$ position in their respective call-stacks are compared at 325. If the actions are the same, the unassigned thread is assigned to the new set at 330, and the process 300 continues at 315. If the actions are different, at 335, a new check is performed in order to find out if every action on $N^{th}$ position in all call-stacks corresponding to unassigned threads have been compared with the action selected at 310. If not, process 300 continues at 320 with selecting action on $N^{th}$ position in a call-stack corresponding to another unassigned thread. If all actions on $N^{th}$ position are compared, process 300 continues from the beginning with assigning an unassigned thread to a new set at 305.

Referring back to FIG. 2, at block 215, one or more threads from a set of previously grouped at block 210, are further grouped in one or more subsets. The criterion for grouping in a subset is whether the threads have at least one more action in common in their corresponding call-stacks. Preferably, threads are grouped that have a particular action in common that is started immediately before the previously identified action in common. Usually, this is the action that invokes the execution of the previously identified action in common and is listed in a next line in a call-stack of a thread in a thread dump stored as a flat file. The previously identified same action is used as a criterion for the prior grouping of the threads. According to one embodiment of the invention, executing block 215 results in one or more sets of threads that are subsets of a previously grouped set of threads, where each subset includes one or more threads having the same subroutine invoking the subroutine which is used as a criterion in the previous grouping. It is possible that all previously grouped threads to be grouped in one subset at block 215.

The task illustrated with block 215 may be repeated recursively for further each set or subset of threads, until, at block 220, it is confirmed that all actions in the call-stacks of every thread in each set or subset are checked. As a result, threads are grouped into a number of subsets upon a criterion of sharing one or more active subroutines. The positions of a first action and of a second action in a call-stack may define subordination between a first set formed using the first action as a grouping criterion, and a second set formed using the second action as a grouping criterion. In one embodiment of the invention, the second set is a subset, or child, to the first set, when the first action is invoked directly or indirectly from the second action. Accordingly, in a thread dump stored as a flat file, the second set is a subordinate set of the first set when the first action is on a higher position in the relevant call-stacks than the second action.

The number of subordinated sets of threads could be organized in a tree representation of the execution data at 225. The tree representation of the execution data is generated based on the common actions performed by the different set of threads on different subordination levels. In the resulting tree structure, each node corresponds to an action in a call-stack of a thread, according to one embodiment of the invention. Each node is associated with a set of threads that are grouped using the respective action as a criterion. An inner or subordinated set of threads is a child of an outer or superior set of threads. Thus, the initially accessed threads at block 205 are associated with the root of the tree. The subroutines or actions that are last run by these threads are direct successors of the root of the tree. The one or more sets of threads with same last run subroutine are associated with the corresponding child nodes. The process of generating the tree representation of execution data may continue until all actions in the call-stacks are consequently assigned as child nodes, and the groups of threads are associated with the corresponding nodes.

Process 200 continues at block 230 with displaying the tree representation of the execution data. The displayed tree representation illustrates groups of threads with similar activity. For example, information about the number of threads that execute the subroutine at the moment when thread dump was created may be displayed at each node of the displayed tree. If a set with a large number of threads is associated with a particular action in an upper position in the tree, there is a high probability that the execution of this action causes problems to the operability of the application server.

Figure 4:
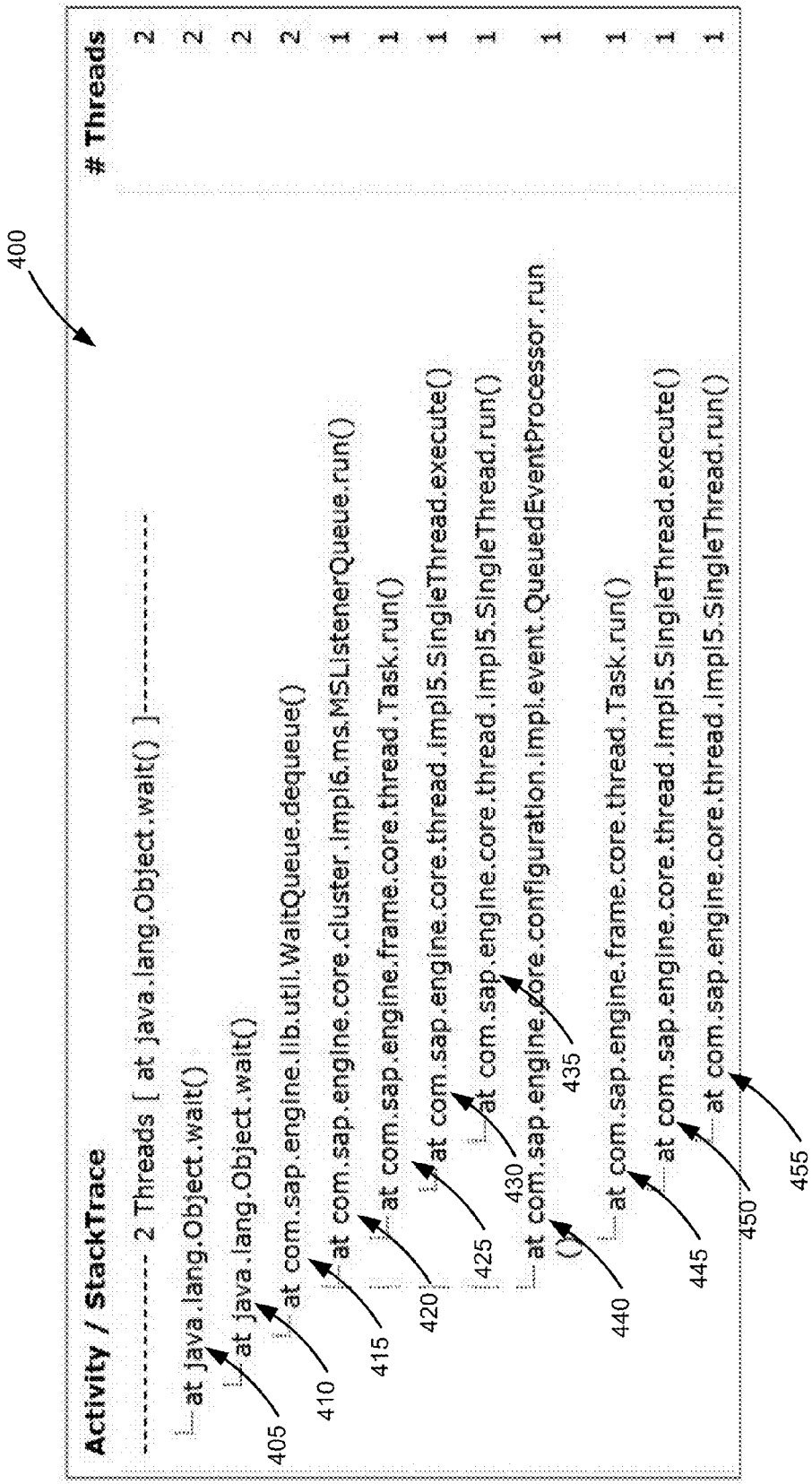
FIG. 4 illustrates an exemplary call-stacks tree structure, according to one embodiment of the invention.

FIG. 4 illustrates an exemplary call-stack tree structure 400, according to one embodiment of the invention. Tree structure 400 represents execution data for the two process threads listed in FIG. 1. Each node in the tree representation corresponds to one of the actions or subroutines in the call-stacks of the threads. Each node has a set of threads assigned to it that are grouped by using the corresponding action. There is no action corresponding to the root of the tree. All threads for which execution data are presented are assigned to the root of the tree representation. As FIG. 4 illustrates, subroutine "at java.lang.Object.wait( )" is the first child of the root illustrated with node 405. This action is the last started action for both threads. In other words, the thread dump was created at the moment when both threads have been executing this particular action. Respectively, both threads are grouped in a set assigned to node 405.

Node 410 is a child to node 405 and corresponds to action "at java.lang.Object.wait( )". The action assigned to node 405 is started immediately after the action assigned to node 410. All actions in a process thread call-stack are active. The execution of the action of node 410 leads or invokes or starts the execution of the action assigned to node 405, according to one embodiment of the invention. Similarly, the execution of action "at com.sap.engine.lib.util.WaitQueue.dequeue( )" assigned to node 415 directly precedes execution of the action assigned to node 410. The actions or subroutines assigned to nodes 410 and 415 are at the same position in both threads. Hence, both threads are grouped in sets associated with nodes 410 and 415, respectively. The set associated with node 415 is a child to the set associated with node 410, which is a child to the set associated with node 405. Each of these sets includes the same two threads, according to the illustrated example.

The action assigned to node 415 is directly preceded by different actions in the call-stacks of the two threads. Therefore, node 415 has two children, node 420 and node 440, to which actions "at com.sap.engine.core.cluster.impl6.ms.MSListenerQueue.run( )" and "at com.sap.engine.core.configuration.impl.event.QueuedEvent Processor. run( )" are assigned, respectively. One of the threads is grouped in a set associated with node 420 that is subset of the set associated with node 415. The other thread is grouped to another set, which is a subset of the set associated with node 415 associated with node 440. The tree structure 400 illustrates active actions or subroutines of the call-stacks of the two threads. Nodes 425, 435 and 440 are successors of node 420; and nodes 445, 450 and 455 are successors to node 440. A common action "at com.sap.engine.fame.core.thread.Task.run( )" is assigned to nodes 425 and 445, but different sets of threads are associated with the nodes. Same is valid for action "at com.sap.engine.core. thread.impl5.SingleThread.executeo ( )" assigned to nodes 430 and 450, and action "at com.sap.engine.core.thread.impl5.SingleThread.run( )"
associated to nodes 435 and 455. The tree representation clearly shows the similarities and the differences in the threads call-stacks.

The example thread dump illustrated with FIG. 1 shows that thread call-stacks are hard to read. Often, the support staff that is investigating the thread dumps does not develop the programs that are run. Therefore, in many cases additional checks in programs source files are necessary in order to find information about the nature of the executed tasks. This hindrance is obvious even in the simplified tree structure illustrated with FIG. 4. Additionally, to get a rough overview of an area in a thread dump, the full stack-trace is often not necessary, but rather a "component" or a "semantic" view on it. Often a number of the actions are started in a sequence in order to perform a same task. It is much easier to analyze the execution data in a thread dump, when the call-stack traces are condensed by mapping specific fragments of the stack (e.g., one or more sequential lines in a thread dump stored as a flat file) referring to a readable description about the nature or purpose of the task performed by the segment.

The mapping between one or more fragments of call-stack traces for a thread and corresponding readable description could be defined in many different ways. For instance, it can be hard-coded in a program, described in database structures, etc. In one embodiment of the invention, such mapping is defined in an extensible markup language (XML) document. Table 1 below lists an example of mapping definition in XML format:

TABLE 1

Sample XML call-stack trace segments mapping definitions

```
<mapping key="WAITING For Free DBPool Connection"
    substitute-text="WAITING For Free DBPool Connection">
<line class="java.lang.Object" method="wait\(.*" />
<line
    class="com.sap.sql.connect.datasource.DBDataSourcePoolImpl"
    method="matchPooledConnection\(.*" />
<line
    class="com.sap.sql.connect.datasource.DBDataSourcePoolImpl"
    method="getConnection\(.*" />
<line
    class="com.sap.engine.core.database.impl.DatabaseDataSourceImpl"
    method="getConnection\(.*" />
</mapping>
<mapping key="Waiting On Monitor"
    substitute-text="Waiting On Monitor">
<line
    class="java.lang.Object"
    method="wait\(.*\).*" />
</mapping>
<mapping key="ConfigManager"
    substitute-text="ConfigManager">
<line
    class="com.sap.engine.core.configuration.*"
    method=".*" />
</mapping>
```

Figure 5:
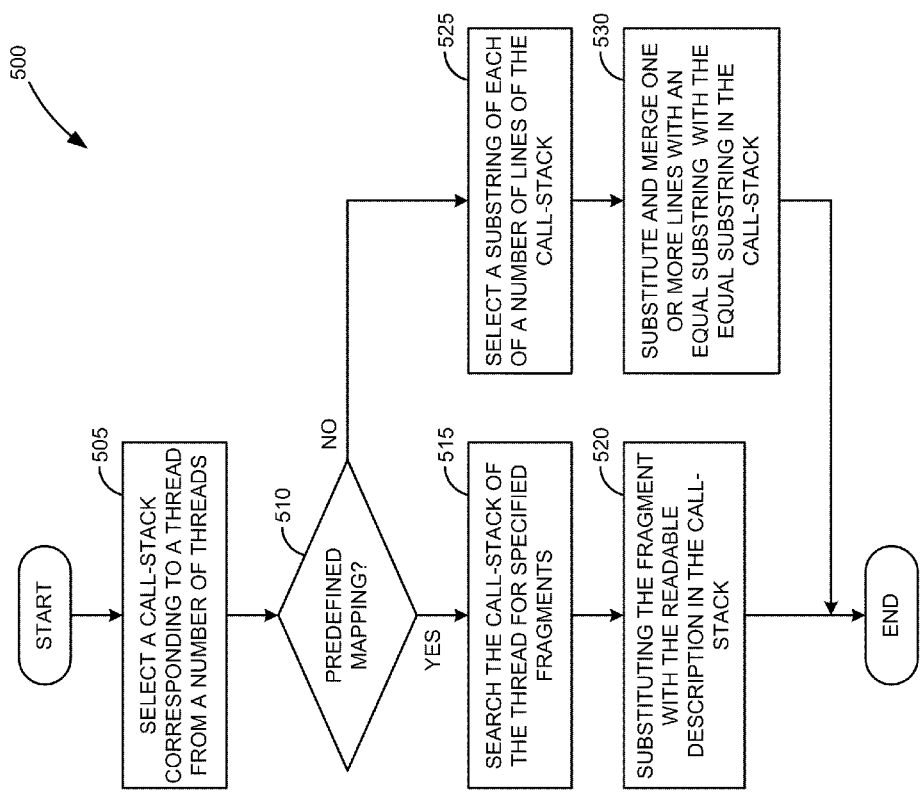
FIG. 5 illustrates a process for condensing call-stacks, according to one embodiment of the invention.

FIG. 5 illustrates an exemplary process 500 for condensing call-stacks by mapping fragments of call-stacks to readable descriptions, according to one embodiment of the invention. Process 500 starts at block 505 with selecting a call-stack corresponding to a thread from a thread dump. At block 510, a check is performed to determine whether there is a predefined mapping between fragments of call-stack traces and readable descriptions. If such mapping is available, at block 515, the call-stack is searched for fragments for which there are predefined mappings to readable description. At block 520, such fragments of the call-stack are replaced or substituted with the corresponding readable descriptions. The result after the replacements is a condensed call-stack.

When there is no predefined mapping between call-stack traces and corresponding description, it is still possible to condense the call-stacks and make them easier to read and analyze. At block 525, a substring of each line of a number of lines of a call-stack is selected. The substrings of each line may have previously specified length and could include symbols from specified positions. Preferably, a number of characters of each line in a call-stack are selected. The selected number of characters could fully or partially include a name of a program component. At block 530, one or more sequential lines of the call-stack with same substrings are condensed (e.g., merged to a single line and substituted with the substring in the call-stack). The resulting condensed call-stack is much shorter, and easier to read and analyze.

In one embodiment of the invention, even when there is predefined mapping, it may not specify correspondence between all fragments of call-stacks and readable description. For such call-stacks, the fragments of code with predefined mapping could be condensed and replaced with the corresponding readable descriptions as illustrated with blocks 515 and 525. In the same call-stacks, the lines that are not mapped could be condensed and replaced as illustrated with blocks 525 and 530.

FIG. 6 illustrates an exemplary correspondence between call-stack fragments of threads listed in FIG. 1 and condensed statements. The correspondence is shown in a table form, where the call-stack fragments are listed in the rows of the first column, and in the same rows of the second column their corresponding condensed statement. Some of the condensed statements are readable descriptions of the actions performed by the subroutines in the call-stack segment. Others of the condensed statements are substrings of the lines of the call-stacks.

Figure 7:
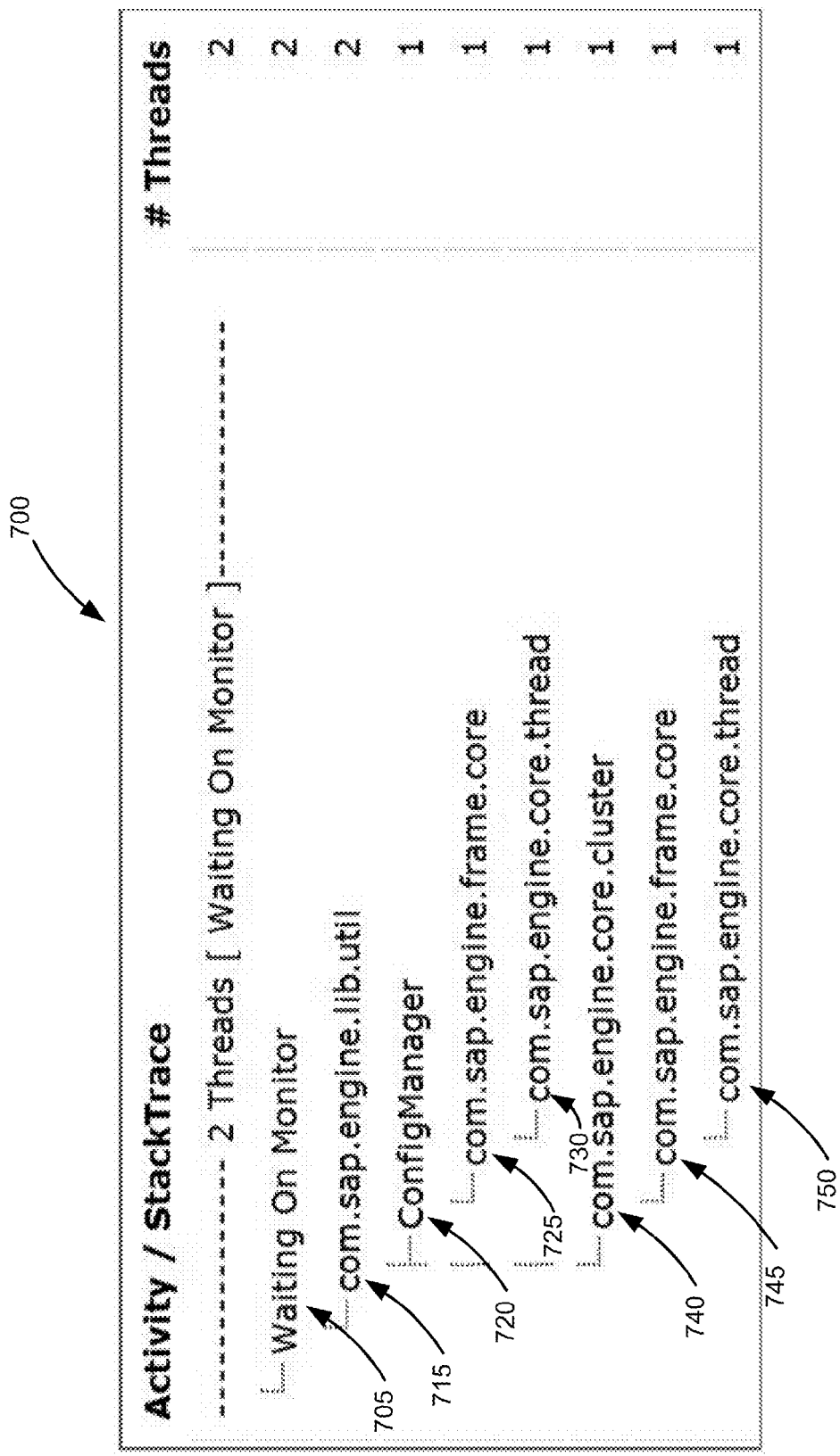
FIG. 7 illustrates tree representation of exemplary condensed call-stacks, according to one embodiment of the invention.

FIG. 7 illustrates a tree representation 700 of the execution data of the threads illustrated in FIG. 1, where the call-stacks are condensed based on the correspondence or mapping illustrated in FIG. 6. The tree representation 700 illustrated with FIG. 7 is much easier to read and analyze than tree representation 400 of the same execution data illustrated with FIG. 4. Node 705 in tree representation 700 corresponds to nodes 405 and 410 in tree representation 400. Similarly, node 730 corresponds to nodes 430 and 435, and node 750 corresponds to nodes 450 and 455. Additionally nodes 715, 720 and 725 corresponds to nodes 415, 420 and 425, respectively. The advantages of the tree representation of thread dump execution data of condensing the corresponding call-stacks could be observed by comparing the unprocessed excerpt of thread dump 100 illustrated in FIG. 1 with its tree representation 700 in FIG. 7.

Figure 8:
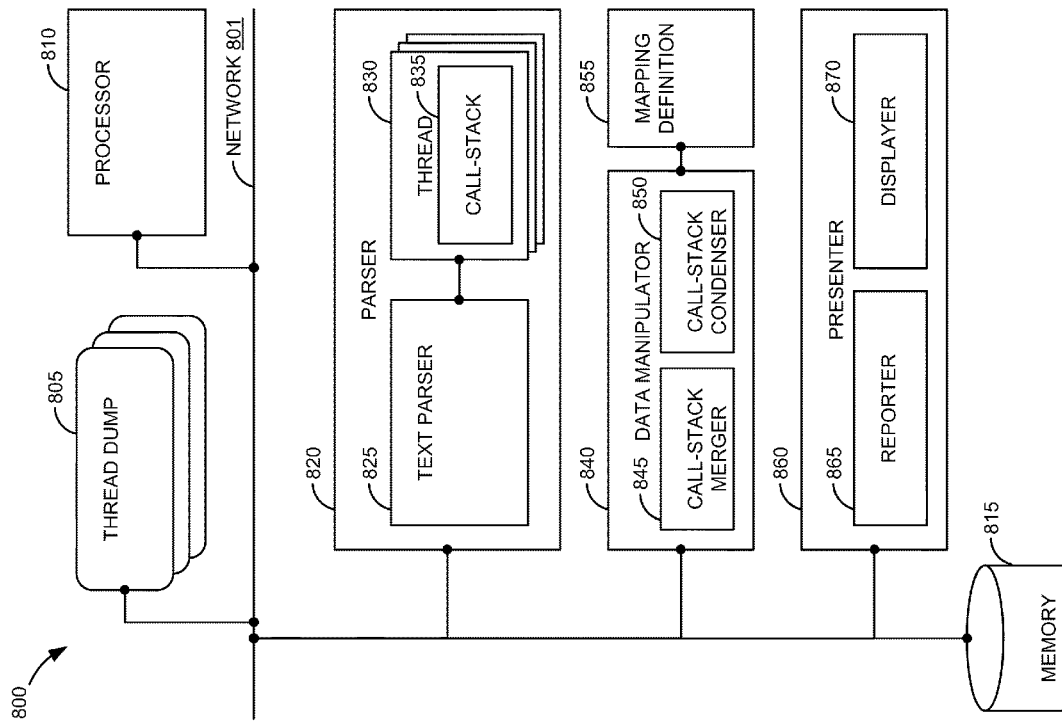
FIG. 8 is a block diagram of an exemplary computer system for call-stacks representation for easier analysis of thread dumps, according to one embodiment of the invention.

FIG. 8 is a block diagram of computer system 800 for generating call-stacks representation for easier analysis of thread dumps, according to one embodiment of the invention. One or more thread dumps 805 are created at a computer system crash. The computer system could be any kind of a computer system. For example, a computer system is a standalone application server or an application server working in a cluster of application servers. When created, thread dumps 805 could be stored in a storage in electronic format as files, as database structures, etc., or could be directly printed without storing in electronic format. In one embodiment of the invention, thread dumps 805 are created in electronic format as flat files. They could also be stored in a remote storage and accessed through network 801. Alternatively, thread dumps 805 could be transferred to local memory 815 where they could be locally accessed by computer system 800. Memory 815 could be a dynamic memory, e.g., random access memory (RAM), or static memory, e.g., hard disk drive (HDD).

Stored thread dumps 805 include execution data for a number of threads. The execution data includes a number of call-stack traces. To each process thread corresponds at least one call-stack that lists all active subroutines of the thread at the moment when thread dump 805 was created. Parser 820 accesses the execution data for the number of threads that are stored in memory 815. Parser 820 includes text parser 825 to read flat file structures of the execution data and to discover the correspondence between each thread 830 and call-stack 835. Call-stack 835 lists traces of all active subroutines of thread 830. In one embodiment of the invention, parser 820 creates or instantiates objects, e.g., Java™ objects, corresponding to the execution data, and more precisely to the included call-stacks traces. These objects are used for further analysis of the execution data during an investigation of the cause for the encountered system crash.

Data manipulator 840 groups threads 830 in one or more sets. The criterion for grouping is an existence of one or more same actions at a particular position in corresponding call-stacks 835. Before grouping in sets, threads 830 could be initially divided in a number of logical entities based on different criteria, e.g., threads from a same process, threads of system processes, threads of application processes, etc. Data manipulator 840 includes call-stack merger 845 to group the threads in the one or more sets based on the same actions in the corresponding call-stacks. Further, call-stack merger 845 associate or the sets of threads to the actions or subroutines used as criterion for grouping the relative sets. Thus, a merged call-stack for the grouped threads is produced.

Data manipulator 840 also includes call-stack condenser 850 to condense fragments of one or more lines from call-stack, according to one embodiment of the invention. To condense one or more lines of a call-stack means to substitute a fragment of the call-stack with a readable description of an action corresponding to the fragment. Often, more than one actions or lines in a call-stack are related to a same general operation in the process. In a condensed call-stack fragments of the call-stack are replaced or mapped to a readable description of a process operation or task. The correspondence between fragments of call-stacks and readable descriptions is provided by mapping definition 855. For example, mapping definition 855 could be an XML document, a table, a relational structure, etc.

Call-stack condenser 850 could substitute a fragment of a call-stack with a substring of a line of the call-stack when there is no mapping defined between the fragment and a readable description. The lines of the call-stacks in a thread dump are usually very long and hard to read. Often, a substring of a line is enough for a reader to understand what general action is performed. The substrings could include symbols extracted from predefined positions of the lines. Lines with same substrings could be condensed to a single line and substituted with the substring.

Parser 820 and data manipulator 840, together with the elements they include, could be loaded in memory 815 as a computer instruction, according to one embodiment of the invention. Processor 810 in communication with memory 815 could execute the instructions in computer system 800 to generate call-stacks representation for easier analysis of thread dumps. Alternatively, parser 820, data manipulator 840, and the elements they include could be implemented as hardware modules, e.g., electronic circuits.

Computer system 800 includes presentation layer provided by presenter 860, according to one embodiment of the invention. Presenter 860 generates tree representation of the execution data for a number of threads of thread dump 805 based on the merged call-stacks. In one embodiment, presenter 860 includes reporter 865 and displayer 870. Reporter 865 generates reports for a user in order to facilitate the thread dump analysis. The reports generated by reporter 865 could include the tree representation of the call-stacks, the thread dumps 805 with condensed call-stacks execution data, a combination between condensed call-stacks and tree representation, etc. Displayer 870 provides various views of the call-stack representations further alleviate the thread dump analysis. Reporter 865 and displayer 870 may provide a user with access or view to a condensed call-stack for each single thread of interest in thread dump 805, and to a condensed or uncondensed tree structure of merged call-stacks for a number of threads of interest.

Systems and methods consistent with the present invention also include computer-readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter. In this document, the meaning of the term "computer readable media" is limited to an article of manufacture for tangibly storing computer-readable instructions.

Figure 9:
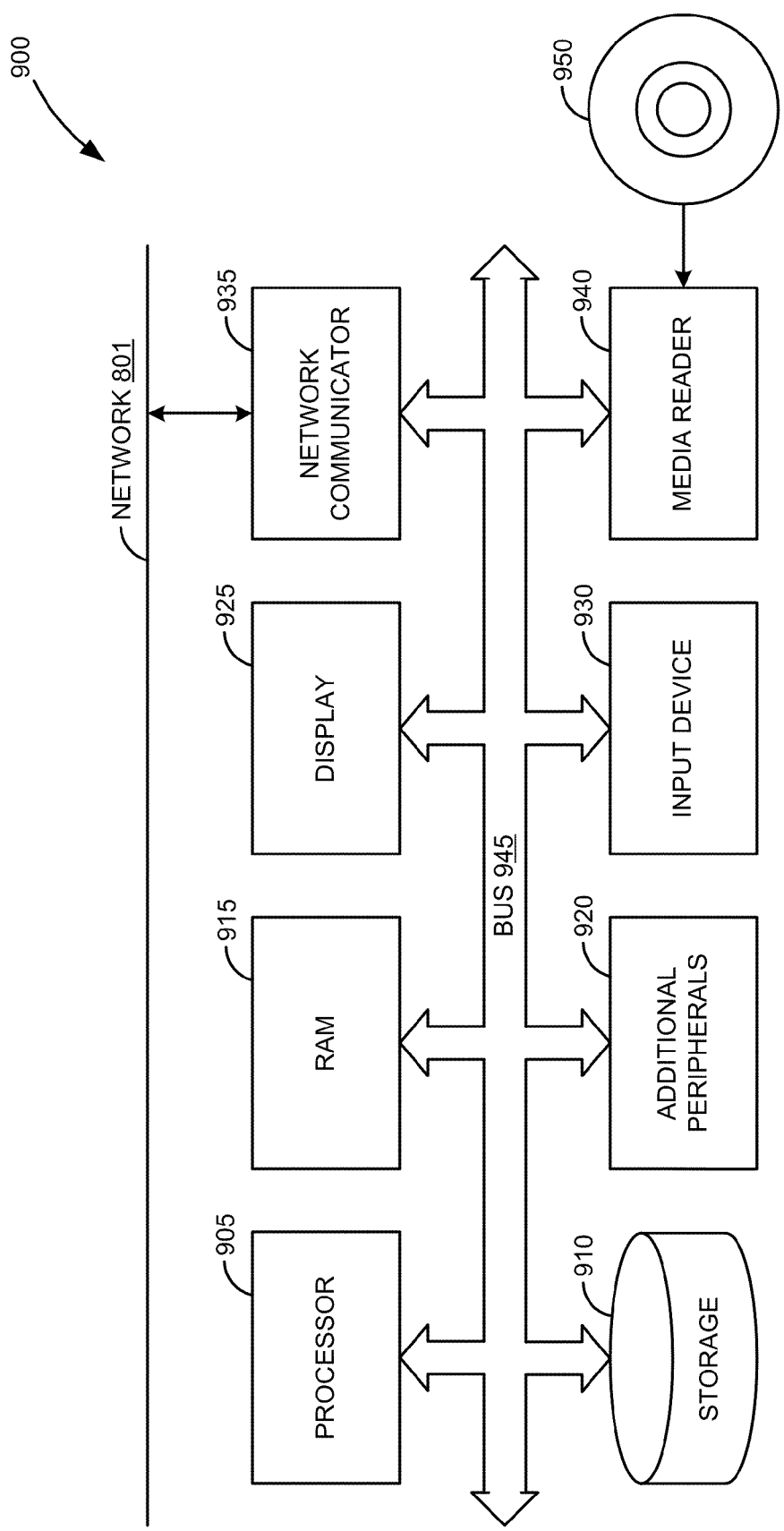
FIG. 9 is a block diagram of an exemplary computer system to execute computer readable instructions for call-stacks representation for easier analysis of thread dumps, according to one embodiment of the invention.

FIG. 9 is a block diagram of an exemplary computer system 900. Computer system 900 includes a processor 905 that executes programming code tangibly stored on computer readable medium 950 to perform the methods of the invention. Computer system 900 includes media reader 940 to read the programming code from computer readable medium 950 and store the code in storage 910 or in random access memory (RAM) 915. Storage 910 provides a large space for keeping static data. The programming code could be stored in storage 910 for later execution. From the programming code, a series of instructions are generated and dynamically stored in RAM 915. Processor 905 reads instructions from RAM 915 and performs actions as instructed.

According to one embodiment of the invention, computer system 900 further includes display 925 to provide visual information to users, input device 930 to provide a user with means for entering data and interfere with computer system 900, one or more additional peripherals 920 to further expand the capabilities of computer system 900, and network communicator 935 to connect computer system 900 to network 801. The modules of computer system 900 are interconnected via bus 945.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A non-transitory computer readable media comprising instructions, which when executed by a processor cause a computer system to:
   access execution data for a plurality of threads from the thread dump data stored in a memory, wherein for each of the plurality of threads the execution data comprises a corresponding call-stack of one or more actions;
   group a first set of threads of the plurality of threads that have a first action in common in their corresponding call-stacks, wherein grouping the first set of threads comprises
      assigning a first thread of the plurality of threads from the thread dump to the first set of threads,
      for a remaining thread of the plurality of threads of the thread dump, comparing an action at a first predefined position in its call-stack with an action at the first predefined position in a call-stack belonging to the first thread assigned to the first set of threads, and
      assigning the remaining thread to the first set of threads, when the action at the first predefined position in its call-stack matches the action at the first predefined position in the call stack corresponding to the first thread assigned to the first set of threads;
   group a second set of threads of the first set of threads that have a second action in common in their corresponding call-stacks;
   generate a tree representation of the execution data for the plurality of threads based on the first common action and on the second common action, wherein the second set of threads of the plurality of threads is a child to the first set of threads of the plurality of threads; and
   display the tree representation of the execution data to illustrate groups of threads with similar activity.

2. The non-transitory computer readable media of claim 1 further comprising computer readable instructions, which when executed by the processor cause the computer system to:
   for one or more threads of the plurality of threads from the thread dump, substitute one or more lines from their corresponding call-stacks with a description of an action corresponding to the one or more lines.

3. The non-transitory computer readable media of claim 2, wherein substituting the one or more lines comprises:
   defining a mapping between the one or more lines of the call-stack and the description.

4. The non-transitory computer readable media of claim 1, wherein accessing the dump file comprises:
   for one or more threads of the plurality of threads from the thread dump, substituting one or more lines from their corresponding call-stacks with a substring of a string of the one or more lines.

5. The non-transitory computer readable media of claim 1, wherein comparing the action at the first predefined position comprises:
   comparing a last started action in the call-stack corresponding to the remaining thread with a last started action in the call-stack corresponding to the first thread assigned to the first set of threads.

6. The non-transitory computer readable media of claim 1, wherein grouping the second set of threads of the first set of threads comprises:

assigning a first thread of the first set of threads to the second set of threads;

for a remaining thread from the first set, comparing an action at a second predefined position in its call-stack with an action at the second predefined position in a call-stack corresponding to the first thread assigned to the second set of threads; and assigning the remaining thread to the second set of threads, when the action at the second predefined position in its call-stack matches the action at the second predefined position in the call-stack corresponding to the first thread assigned to the second set of threads.

7. A computer implemented method for analyzing a thread dump data resulting from execution of computer code, the method comprising:

accessing execution data for a plurality of threads from the thread dump data stored in a memory, wherein for each of the plurality of threads the execution data comprises a corresponding call-stack of one or more actions;

grouping a first set of threads of the plurality of threads that have a first action in common in their corresponding call-stacks, wherein grouping the first set of threads comprises assigning a first thread of the plurality of threads from the thread dump to the first set of threads, for a remaining thread of the plurality of threads of the thread dump, comparing an action at a first predefined position in its call-stack with an action at the first predefined position in a call-stack belonging to the first thread assigned to the first set of threads, and assigning the remaining thread to the first set of threads, when the action at the first predefined position in its call-stack matches the action at the first predefined position in the call-stack corresponding to the first thread assigned to the first set of threads;

grouping a second set of threads of the first set of threads that have a second action in common in their corresponding call-stacks;

generating a tree representation of the execution data for the plurality of threads based on the first common action and on the second common action, wherein the second set of threads of the plurality of threads is a child to the first set of threads of the plurality of threads; and displaying the tree representation of the execution data to illustrate groups of threads with similar activity.

8. The computer implemented method of claim 7 further comprises:

for one or more threads of the plurality of threads from the thread dump, substituting one or more lines from their corresponding call-stacks with a description of an action corresponding to the one or more lines.

9. The computer implemented method of claim 8, wherein substituting the one or more lines comprises:

defining a mapping between the one or more lines of the call-stack and the description.

10. The computer implemented method of claim 7, wherein accessing the dump file comprises:

for one or more threads of the plurality of threads from the thread dump, substituting one or more lines from their corresponding call-stacks with a substring of a string of the one or more lines.

11. The computer implemented method of claim 7, wherein comparing the action at the first predefined position comprises:

comparing a last started action in the call-stack corresponding to the remaining thread with a last started action in the call-stack corresponding to the first thread assigned to the first set of threads.

12. The computer implemented method of claim 7, wherein grouping the second set of threads of the first set of threads comprises:

assigning a first thread of the first set of threads to the second set of threads;

for a remaining thread from the first set, comparing an action at a second predefined position in its call-stack with an action at the second predefined position in a call-stack corresponding to the first thread assigned to the second set of threads; and assigning the remaining thread to the second set of threads, when the action at the second predefined position in its call-stack matches the action at the second predefined position in the call-stack corresponding to the first thread assigned to the second set of threads.

13. A computer system for analyzing a thread dump comprising:

a memory to store execution data for a plurality of threads in a thread dump, wherein for each of the plurality of threads the execution data comprises a corresponding call-stack of one or more actions; and a processor in communication with the memory and operable to execute instructions to generate:

a parser to access the execution data for the plurality of threads from the thread dump, a data manipulator operable to group a first set of threads of the plurality of threads that have a first action in common at a first predefined position in the corresponding call-stacks, the data manipulator further to group a second set of threads of the first set of threads that have a second action in common at a second predefined position in the corresponding call-stacks, and a presenter to generate a tree representation of the execution data for the plurality of threads based on the first common action and on the second common action, wherein the second set of threads of the plurality of threads is a child to the first set of threads of the plurality of threads.

14. The computer system of claim 13, wherein the memory further comprises:

a mapping definition to define correspondence between a fragment of a call-stack and a readable description of an action, the fragment including one or more lines of the call-stack.

15. The computer system of claim 13, wherein the parser comprises:

a text parser to read the execution data for the plurality of threads in a flat format from the thread dump and distinguish for each thread of the plurality of threads from the thread dump a plurality of objects and a object properties.

16. The computer system of claim 13, wherein the data manipulator comprises:

a condenser to substitute one or more lines from a call-stack with a readable description of an action corresponding to the one or more lines or a substring of a string of the one or more lines.

17. The computer system of claim 13, wherein the data manipulator comprises:

a merger to group one or more sets of the plurality of threads that have one or more same actions in corresponding call-stacks 18. The computer system of claim 13, wherein presenter comprises:
a reporter to generate a report to a user including one of a condensed call-stack corresponding to a thread from the plurality of threads and the tree representation of execution data for the plurality of threads based on the one or more condensed sets of the plurality of threads.

* * * * *